(12) United States Patent
D'Addio

(10) Patent No.: US 8,059,025 B2
(45) Date of Patent: Nov. 15, 2011

(54) ALTIMETRY METHOD AND SYSTEM

(75) Inventor: Salvatore D'Addio, Leiden (NL)

(73) Assignee: Agence Spatiale Europeenne, Paris (FR)

( * ) Notice: Subject to any disclaimer, the term of this patent is extended or adjusted under 35 U.S.C. 154(b) by 203 days.

(21) Appl. No.: 12/498,715

(22) Filed: Jul. 7, 2009

(65) Prior Publication Data
US 2010/0007547 A1    Jan. 14, 2010

(30) Foreign Application Priority Data

Jul. 11, 2008  (EP) .................................. 08290686

(51) Int. Cl.
*G01S 13/08* (2006.01)
*G01S 13/89* (2006.01)
*G01S 13/00* (2006.01)

(52) U.S. Cl. .......... 342/120; 342/89; 342/118; 342/175; 342/190; 342/191; 342/195; 342/350; 342/351; 342/352; 342/450; 342/462; 375/130

(58) Field of Classification Search ....... 342/25 R–25 F, 342/59, 118, 120–123, 175, 176, 179, 190–197, 342/126, 188, 351, 352, 89, 350, 357.2, 357.39, 342/357.395, 450–465; 701/200, 207, 213–215; 375/130–153
See application file for complete search history.

(56) References Cited

U.S. PATENT DOCUMENTS

| | | | | |
|---|---|---|---|---|
| 2,837,738 A * | 6/1958 | Van Valkenburgh | .......... | 342/455 |
| 3,171,126 A * | 2/1965 | Wiley | ............................ | 342/458 |
| 3,624,650 A * | 11/1971 | Paine et al. | .................... | 342/191 |
| 3,721,986 A * | 3/1973 | Kramer | ......................... | 342/453 |
| 3,888,122 A * | 6/1975 | Black | ............................. | 342/352 |
| 4,370,656 A * | 1/1983 | Frazier et al. | ................. | 342/126 |
| 4,386,355 A * | 5/1983 | Drew et al. | ................ | 342/357.2 |
| 4,550,601 A * | 11/1985 | Evans | ......................... | 73/382 R |
| 4,595,925 A * | 6/1986 | Hansen | ......................... | 342/120 |
| 4,602,257 A * | 7/1986 | Grisham | ..................... | 342/25 F |
| 4,727,373 A * | 2/1988 | Hoover | ......................... | 342/25 F |

(Continued)

FOREIGN PATENT DOCUMENTS

EP          1 279 970          1/2003

(Continued)

OTHER PUBLICATIONS

International Search Report for European Application No. 08290686.8, filed Jul. 11, 2008.

(Continued)

*Primary Examiner* — Bernarr Gregory
(74) *Attorney, Agent, or Firm* — Alston & Bird LLP

(57) ABSTRACT

An altimetry method comprising: providing a signal receiver (RX) on a first platform (S1) flying above a portion of the Earth surface (ES), for receiving a temporal series of signals emitted by a second flying platform (S2) and scattered by said portion of the Earth surface; and computing altimetry waveforms, indicative of an elevation profile of said portion of the Earth surface, by processing the received signals; characterized in that said step of computing altimetry waveforms comprises: cross-correlating the received signals with a plurality of locally-generated frequency-shifted replicas of the emitted signals; introducing a frequency-dependent temporal shift to the correlation waveforms in order to compensate for range delay curvature; and incoherently summing the temporally shifted correlation waveforms (CXC) corresponding to signals scattered by a same region of the Earth surface at different times during motion of said first platform.

15 Claims, 4 Drawing Sheets

U.S. PATENT DOCUMENTS

| | | | | |
|---|---|---|---|---|
| 4,922,254 A * | 5/1990 | Schuessler et al. | 342/25 F |
| 5,051,749 A * | 9/1991 | Stoyle | 342/25 A |
| 5,160,932 A * | 11/1992 | Bull | 342/25 B |
| 5,170,171 A * | 12/1992 | Brown | 342/191 |
| 5,189,424 A * | 2/1993 | Brown | 342/25 C |
| 5,260,708 A * | 11/1993 | Auterman | 342/25 C |
| 5,264,852 A * | 11/1993 | Marquet | 342/25 R |
| 5,323,162 A * | 6/1994 | Fujisaka et al. | 342/25 B |
| 5,546,087 A | 8/1996 | Martin | |
| 5,736,957 A * | 4/1998 | Raney | 342/120 |
| 6,025,800 A * | 2/2000 | Hager | 342/450 |
| 6,137,437 A * | 10/2000 | Lin et al. | 342/25 B |
| 6,861,978 B2 * | 3/2005 | Lam | 342/351 |
| 7,570,202 B2 * | 8/2009 | Raney | 342/25 F |
| 2004/0145514 A1 * | 7/2004 | Raney | 342/120 |

FOREIGN PATENT DOCUMENTS

WO    WO 02/079798    10/2002

OTHER PUBLICATIONS

Keith Raney: "The Delay/Dopplar Radar Altimeter"; IEEE Transactions on Geoscience and Remote Sensing, IEEE Service Center, Piscataway, NJ, US; vol. 36, No. 5; Sep. 1, 1998; XP011021108.

Elfouhaily T et al: "Delay-Doppler analysis of bistatically reflected signals from the ocean surface: theory and application"; IEEE Transactions on Geoscience and Remote Sensing, IEEE Service Center, Piscataway, NJ, US; vol. 40, No. 3; Mar. 1, 2000; pp. 560-573; XP002273419.

* cited by examiner

ALTIMETRY METHOD AND SYSTEM

FIELD AND BACKGROUND OF THE INVENTION

The invention relates to an altimetry method and system for determining an elevation profile of a portion of the Earth surface. More precisely, the invention relates to a bistatic passive altimetry method, using opportunity signals such as GNSS signals and incorporating delay-doppler curvature compensation.

The invention can be applied, in particular, to the field of satellite altimetry for oceanography.

The possibility to measure with high accuracy the mesoscale ocean topography is of primary importance for oceanographers, meteorologists or climatologists in order to improve the understanding of ocean circulation, ocean bathymetry, eddies, tides and Earth climate models.

Over the last years, conventional radar altimeters have provided huge amount of data, allowing the observation of many ocean features. However, since they are based on observing the ocean on a small footprint along nadir-looking direction, classical altimeters such as TOPEX/Poseidon, Jason, or ESA RA and RA-2 are not able to provide high spatial-temporal sampling, absolutely necessary to map properly ocean mesoscale features, unless deployed in ad-hoc constellations.

The wide swath ocean altimeter has been envisaged as a potential solution to increase spatiotemporal sampling; however it is a very complex and costly solution. See W. J. Emery, D. G. Baldwin, D. K. Matthews, "Sampling the Mesoscale Ocean Surface Currents With Various Satellite Altimeter Configurations", IEEE Transactions on Geoscience and Remote Sensing, Vol. 42, No. 4, April 2004, 795.

In this context, since 1993 European Space Agency and later European industry have been working on the idea to make use of GNSS (Global navigation Satellite System) signals reflected from the ocean's surface in order to perform altimetry. The technique, designated as "PARIS" (Passive Reflectometry and Interferometry System), has been investigated and experimentally proven by ESA, NASA and many other space and non-space related research organizations. PARIS is a very wide swath altimeter, capable of reaching a swath of 1000 km or more, depending on orbital altitude, as it picks up ocean-reflected (and direct) signals from several GNSS satellites, up to 12 tracks when Galileo will be available.

For a detailed description of the PARIS technique, see:
M. Martin-Neira, "A Passive Reflectometry and Interferometry system (PARIS): Application to Ocean Altimetry", ESA Journal, 1993;
U.S. Pat. No. 5,546,087; and
G. A. Hajj, C. Zuffada, "Theoretical Description of a Bistatic System for Ocean Altimetry Using the GPS Signal", Radio Science, Vol38, No5, October 2003.

Due to the global coverage and the bi- or multi-static nature of this technique, a low-Earth-orbiting PARIS instrument would allow high spatial-temporal sampling of the Earth surface. For these reasons PARIS has been identified as a very promising complementary technique with respect to conventional radar altimeters in order to address mesoscale altimetry or fast tsunami detection. The precision requirement in order to properly perform mesoscale altimetry is considered as 5 cm height precision over a spatial extent of 100 km at most. See P.Y. Le Traon and G. Dibarboure, G. Ruffini, E. Cardellach, "Mesoscale Ocean Altimetry Requirements and Impact of GPS-R measurements for Ocean Mesoscale Circulation Mapping, Technical Note Extract from the PARIS-BETA ESTEC/ESA Study" ESTEC, Dec. 2002.

However, a major disadvantage of this technique is that, being intrinsically passive, it is highly dependent on the characteristics of the available navigation signals. Indeed, transmitted signals power and bandwidth are the most important parameters driving the performance of an altimeter, either radar or PARIS based, either mono-static or bi-static. Currently transmitted navigation signals show significantly reduced power and bandwidth with respect to conventional radar altimeters. This implies poorer altimetry precision, accuracy and resolution per pulse. Several studies and results from airborne experimental data have predicted that a space based PARIS receiver exploiting GPS C/A code cannot meet ocean mesoscale altimetry requirements, even adopting maximum reasonable instrument dimensions.

On the other hand, the exploitation of a GPS P-code-like signal (which presents wider bandwidth, and, in turn, better performances) is on the limit of fulfilling the mesoscale requirements for a spatial resolution of 100 km, as shown by O. Germain and G. Ruffini in their paper "A revisit to the GNSS-R code range precision", Proceedings of GNSS-R Workshop, 14-15 Jun. 2006, ESTEC.

The invention aims at improving the performances of the PARIS technique, i.e. its precision, accuracy and/or spatial resolution.

SUMMARY OF THE INVENTION

According to the invention, such an improvement can be achieved by applying delay-Doppler curvature compensation to passive bistatic altimetry using "opportunity" (e.g. GNSS) signals.

Delay-Doppler curvature compensation—also known as range delay curvature compensation—is a signal processing technique introduced in 1998 by R. K. Raney in order to improve the spatial resolution of conventional monostatic radar altimeters: see R. Keith Raney, "The Delay/Doppler Radar Altimeter", IEEE Transactions on Geoscience and Remote Sensing, vol. 36, no. 5, September 1998; and U.S. Pat. No. 5,736,957.

Application of delay-Doppler curvature compensation to a PARIS-like passive bistatic altimetry technique is not straightforward and requires specific adaptation.

More specifically, an object of the present invention is an altimetry method for determining an elevation profile of a portion of the Earth surface. Such a method comprises the steps of:
(a) providing a signal receiver on a first platform flying above said portion of the Earth surface, for receiving a temporal series of signals emitted by a second flying platform and scattered by said portion of the Earth surface; and
(b) computing altimetry waveforms, indicative of the elevation profile of said portion of the Earth surface, by processing the received signals;
and is characterized in that said step of computing altimetry waveforms comprises:
(b.1.1) determining correlation waveforms by cross-correlating the received signals with a plurality of frequency-shifted replicas of the emitted signals, the frequency shift of each replica corresponding to the average Doppler shift of the signals reflected at a given time by a particular region of the Earth surface;
(b.1.2) introducing a temporal shift to the correlation waveforms in order to compensate for range delay curvature; and (b2) incoherently summing the temporally shifted correlation waveforms corresponding to signals scattered by a same region of the Earth surface at different times during motion of the first platform.

Advantageous features of the invention constitute the subject-matter of the dependent claims.

Another object of the invention is an altimetry system comprising a satellite carrying a receiver for receiving a temporal series of known signals emitted by a second satellite and scattered by a portion of the Earth below said satellite; and signal processing means for carrying out an altimetry method according to the invention.

BRIEF DESCRIPTION OF THE DRAWINGS

Additional features and advantages of the present invention will become apparent from the subsequent description, taken in conjunction with the accompanying drawings, which show.

DETAILED DESCRIPTION

Figure 1:
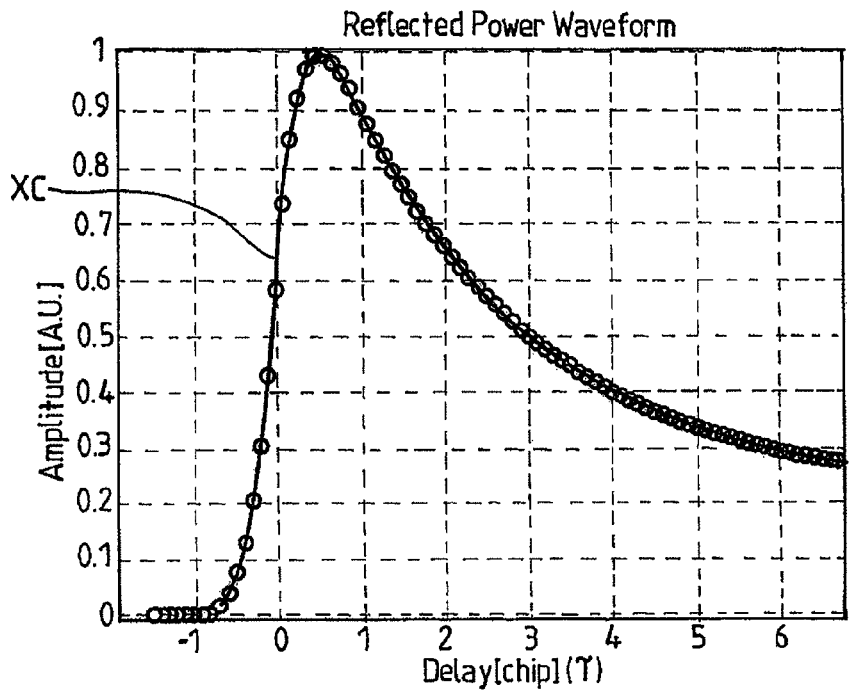
FIG. 1, the cross-correlation trace of a scattered GNSS signal received by a space-born altimeter according to the invention, with a locally generated replica thereof.

In order to estimate the height of a target point SP on the surface of the Earth with respect to a reference ellipsoid, a PARIS altimeter computes the cross-correlation of a known replica of the navigation code with the received navigation code pulses reflected/scattered off the surface of the Earth; the target point SP (called specular reflection point) is defined as the point of the Earth surface which reflects specularly the navigation code pulses received by the altimeter. FIG. 1 represents a typical PARIS cross-correlation waveform (XC) for a spread-spectrum GNSS signal such a GPS signal. As in conventional radar altimetry, the distance between the space-borne receiver and the reflecting point on the Earth surface—and therefore the elevation of said reflecting point—is determined by estimating the half power point HP on the rising edge of the waveform XC.

Indeed, computing the cross-correlation of the reflected GNSS signal with a locally generated replica thereof yields the distance from the GNSS satellite to the altimeter via an indirect path passing through the specular reflection point SP. At the same time, the altimeter also receives the same GNSS signal through a direct, free-space path, allowing computation of the straight-line distance between the altimeter and the GNSS satellite. At this point, determining the altitude of the specular reflection point SP with respect to a reference ellipsoid reduces to a simple geometrical problem.

Therefore, a PARIS altimeter estimates the minimum radar range by processing a navigation signal specularly or nearly-specularly reflected by the Earth surface. More precisely, assuming a quasi-flat Earth surface (which is reasonable for oceanographic applications) the reflected signal useful for altitude determination comes from a footprint limited by the length of a code chip (also referred to as one-chip footprint). This is analogous to the notion of "pulse-limited footprint" in conventional radar altimetry.

Typically, a PARIS altimeter satellite is provided with a multibeam antenna whose 3 dB footprint is much wider than the one-chip footprint. Each antenna beam is scanned in order to follow the specular reflection point on the sea surface.

Indeed, at each time, the PARIS altimeter satellite is in view of many points of reflection, since many GNSS satellite are in visibility. If Galileo and GPS constellations are available, it can be calculated that in average the PARIS satellite has simultaneous access to eight reflection points, which can be tracked for extracting altimetry data according to the processing method of the invention.

In order to guarantee a good signal-to-thermal noise ratio, a multibeam antenna with eight beams with medium/high gain is foreseen. A geometry processor drives the multibeam antenna in order to point each beam towards a respective reflection point, whose position is adaptively computed in real time.

In reality, a GNSS signal impinging on the Earth surface is not specularly reflected, but rather scattered over a relatively broad solid angle Therefore, at each given time the receiving antenna also receives a significant amount of power scattered by points lying outside the one-chip footprint. According to prior art, this power cannot be used for altitude, and is effectively lost.

This reduces the already low available signal power, and negatively affects the precision and accuracy of the altimeter.

Figure 2:
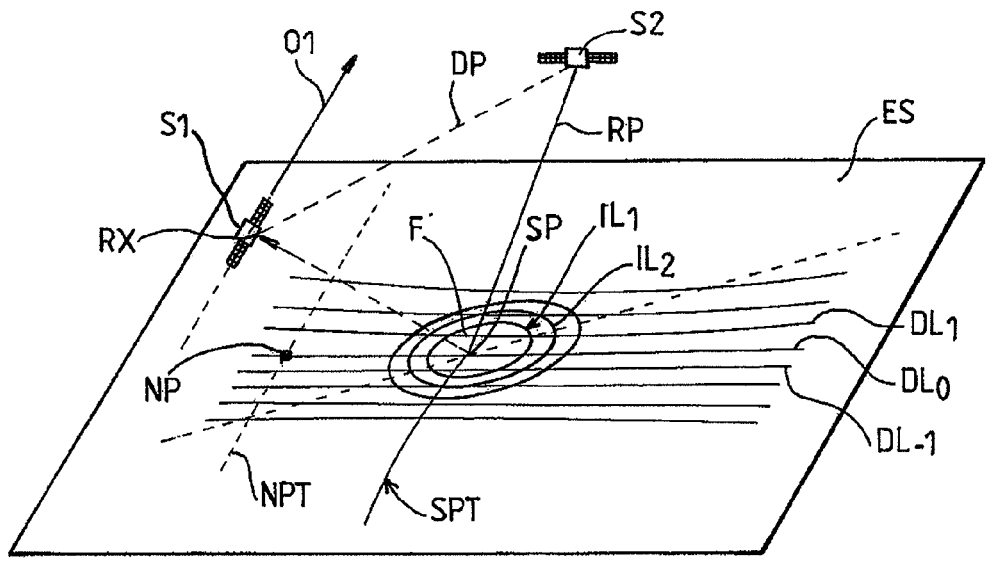
FIGS. 2 and 3, the geometry of the PARIS altimetry method, known from prior art.

FIG. 2 represents, schematically, the geometry of a PARIS system.

The plane ES represent the Earth surface (more particularly, the ocean surface, since the technique is essentially directed to oceanographic applications), which can be considered flat in a first approximation. The satellite S1 moves along a LEO orbit O1 at an altitude of e.g. 700 km, and carries a receiver RX for receiving GNSS signals emitted by a second satellite S2, orbiting at a much higher altitude (MEO or GEO orbit). More precisely, the receiver RX receives the GNSS signals from both a direct path DP and a longer reflected path RP; the reflected path corresponds to specular reflection from a "specular point" SP. The line SPT represents the track of the specular point as satellites S1, S2 move along the respective orbits (actually, motion of S2 can be neglected in first approximation, due to the high altitude of the GNSS satellite). Note that, unlike in conventional radar altimetry, the point SP, the altitude of which is measured, is not the "nadir point" NP of the satellite S1 (NPT representing the nadir point track on the Earth surface).

As discussed above, the useful signal for altitude determination does not come only from the specular point SP, but from an elliptical footprint F centered on said point (footprint F is elliptical instead of being circular like in conventional radar altimetry because SP is not the nadir point). The size of the footprint F is directly related to the duration of the navigation code chip on which correlation is performed. The ellipses $IL_1$, $IL_2$ surrounding the specular point SP are the so-called "iso-delay lines", i.e. the loci of points of the Earth surface ES having a same distance from the satellite S1. More precisely, $IL_1$ is the intersection of the Earth surface with a three-dimensional ellipsoid defined by the condition: $D_{S1-SP}+D_{S2-SP}=$constant$=c\cdot T_{chip}$, where:

$D_{S1-SP}$ is the distance between S1 and the specular point SP;

$D_{S2-SP}$ is the distance between S2 and the specular point SP;

$T_{chip}$ is the duration of one navigation code chip; and c is the speed of light.

Similarly, $IL_2$ is the "iso-delay line" associated to an ellipsoid defined by $D_{S1-SP}+D_{S2-SP}=2\cdot c\cdot T_{chip}$ and so on. It can be understood that $IL_1$ delimits the one-chip footprint F.

Due to the motion of satellite S1 along its orbit O1, the signals received by the receiver RX are frequency-shifted by Doppler effect. The Doppler shift of an electromagnetic wave scattered by a generic point of the Earth surface depends on the position of said point and on the velocity of the satellite S1 along its orbit O1. On FIG. 2, lines $DL_1$, $DL_0$ and $DL_1$ represent the so-called "iso-Doppler lines", i.e. the loci of points of the Earth surface ES corresponding to a same Doppler shift. To first order the iso-Doppler lines are hyperbolas with a symmetry axis defined by the projection of the receiver's velocity on Earth's surface. These lines determine regions on the sea surface appearing as contiguous "stripes", or zones ($DZ_2$, $DZ_1$, $DZ_0$, $DZ_1$, $DZ_2$ on FIG. 3) whose width is inversely proportional to the coherent integration time adopted to process the reflected pulses.

Figure 3:
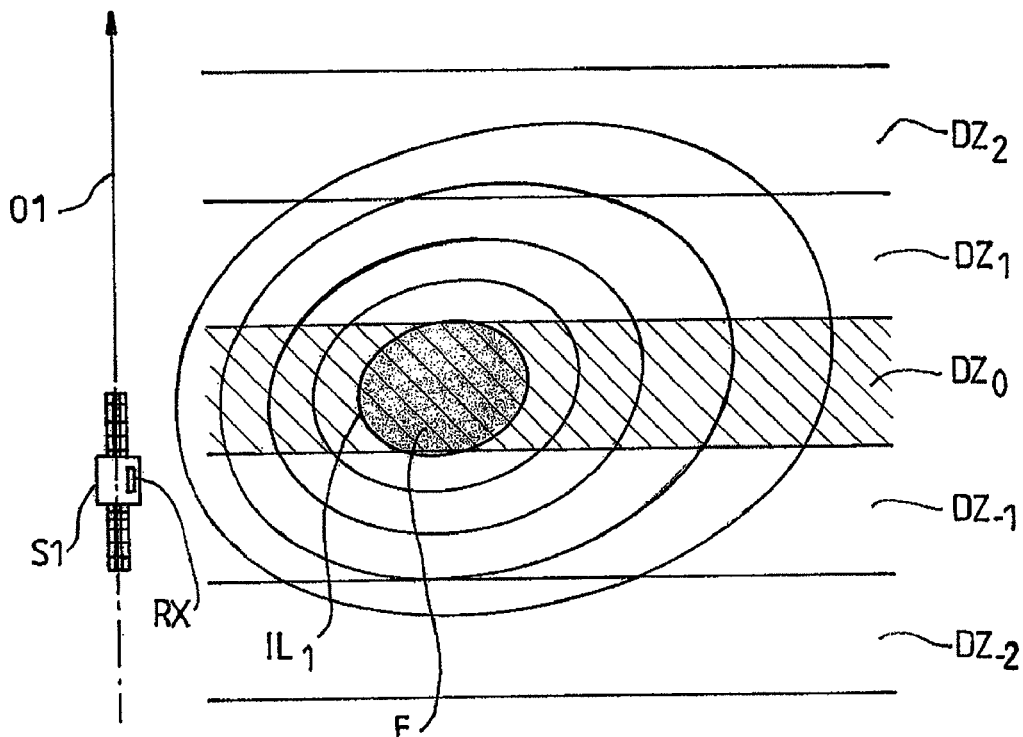

As shown on FIG. 3, in the case of a conventional PARIS altimeter, the width of the Doppler zone $DZ_0$ coincides with that of the one-chip footprint F; indeed, it can be shown that this is the optimal choice in term of signal-to-noise ratio and, in turn, of final height precision. The signals coming from the outer Doppler zones $DZ_2$, $DZ_1$, $DZ_1$, and $DZ_2$ are simply discarded, even if these zones fall within the 3 dB beamwidth of the receiving antenna.

Doppler-delay curvature compensation is advantageous in that it allows exploitation of the signals scattered by points on the Earth surface lying within several Doppler zones, only limited by the antenna beamwidth. As a consequence, the available signal power is used more efficiently than in conventional PARIS altimetry.

As mentioned before, a conventional PARIS altimeter performs cross-correlation of the reflected signal with an on-board generated code replica, tuned in frequency to the Doppler frequency corresponding to the specular point echo return. Instead, an altimeter according to the invention performs a plurality of parallel cross-correlations of the reflected echo with a set of N frequency-shifted code replicas, the frequency shift of each replica corresponding to a possible value of the Doppler shift introduced by the motion of the satellite, i.e. corresponding to a different Doppler zone on the surface of the Earth.

The Doppler separation within two code replicas is chosen in order to ensure that the corresponding Doppler regions on the Earth surface are adjacent without overlapping. According to known properties of the Fourier transform the width of said Doppler regions, and therefore the Doppler frequency separation between code replicas, is inversely proportional to the coherent integration time.

Avoiding the overlapping of Doppler regions is important in order to guarantee that the N output correlation waveforms are statistically independent. In turn, this ensures the effectiveness of the subsequent incoherent integration step.

Compared to classical PARIS altimetry, where a single correlation waveform tuned to the Doppler frequency of the specular point is evaluated, an altimeter according to the invention produces N correlation waveforms, from which N different height measurement can be performed, allowing better measurement prediction.

However, the correlation waveforms corresponding to different Doppler regions are subject to extra-delays with respect to the one corresponding to the specular point (also referred hereinafter to as "Zero Doppler region"). This extra-delay is induced by the spherical curvature of the transmitted pulse wavefront as it impinges on the ocean's surface; therefore, this effect is known as delay-Doppler curvature. Since the height estimation is performed by evaluating waveform delays, the unwanted extra-delays have to be compensated in order to correctly measure ocean height from each of the waveforms. By applying delay correction, each waveform can be aligned with respect the one corresponding to the specular point (Zero Doppler region).

The additional delay introduced by delay-Doppler curvature can be precisely evaluated, provided that the relative positions of the satellites S1, S2 and the Earth are known. This allows performing the required correction.

Figures 4A, 4B:
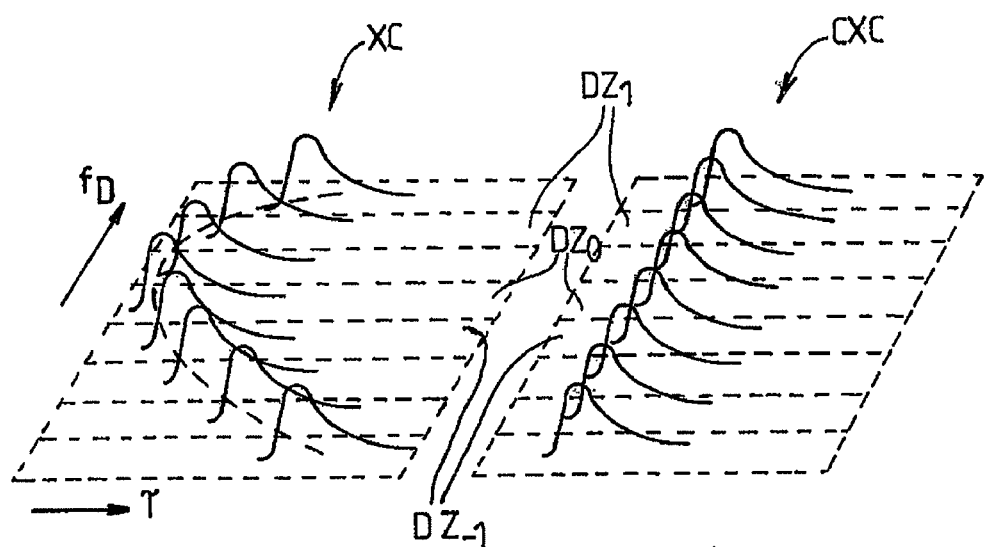
FIGS. 4A and 4B, the compensation of the range delay curvature of a set of correlation waveforms corresponding to different Doppler shifts.

FIG. 4A shows N correlation waveforms XC, represented as functions of the correlation Delay $\tau$, corresponding to different Doppler frequencies ($f_D$) and therefore to different Doppler zones on the Earth surface. FIG. 4B represents the same waveforms after correction of the delay-Doppler curvature, performed by introducing a Doppler frequency-dependent temporal shift $\Delta\tau(f_D)$. The corrected waveforms CXC are perfectly aligned, indicating that the different Doppler zones have a same average elevation, i.e. that the Earth surface is flat at the scale of the spatial resolution of the instrument. Elevation differences between Doppler zones would introduce a misalignment (i.e. a residual temporal shift) between the corresponding corrected waveforms.

Delay/Doppler processing allows applying a cross-correlation coherent integration time significantly higher with respect to the case of conventional PARIS altimeter. Indeed, for the classical case, the optimum coherent integration time is obtained when the Zero Doppler region bounds precisely the along track dimension of the pulse limited footprint, as already represented on FIG. 3. In other words, in a conventional PARIS altimeter the coherent integration time is chosen to match the correlation time of the reflection by the pulse limited footprint. A choice of the coherent integration time higher than this value would imply a reduction of measurement precision due to lower available time for incoherent averaging, given a fixed value of spatial resolution on the ocean. This is no longer true when delay/Doppler processing is applied. In this case, as power returns from neighboring Doppler regions are processed, further increasing the coherent integration time does not reduce the available incoherent averaging.

It should be underlined that using a longer-than-usual coherent integration (e.g. correlation) time is made possible by the fact that pulse-to-pulse phase coherence is intrinsically satisfied in navigation signals. As a consequence, the length of the code replicas adopted in the cross-correlation directly determines the coherent integration time length.

Figure 5:
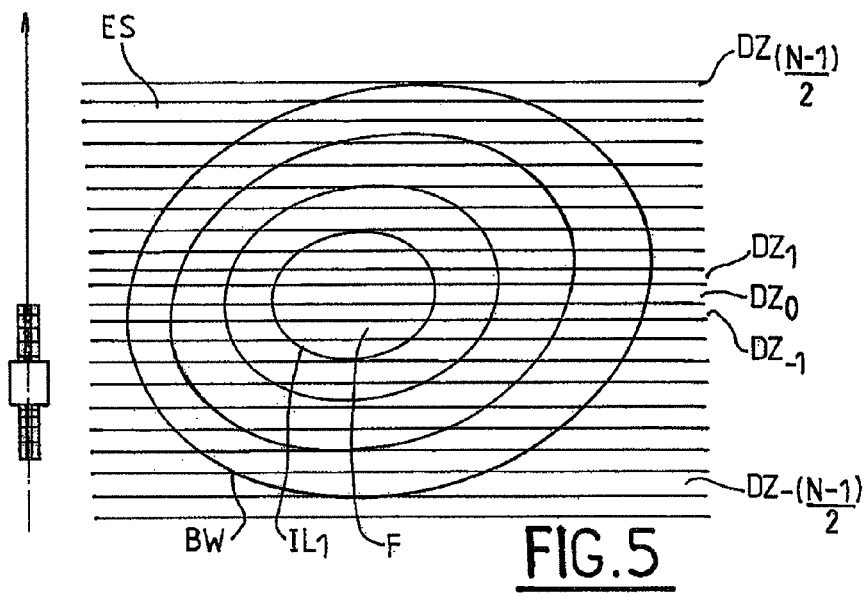
FIGS. 5 and 6, the geometry of the altimetry method of the invention, emphasizing the differences with respect to the PARIS technique.

The illumination geometry of an altimeter according to the invention, adopting high coherent integration time is depicted in FIG. 5. It can be seen that several narrow Doppler zones lie within the one-chip footprint F. Moreover, signals coming from regions of the Earth surface lying outside said one-chip footprint F, but within the beamwidth BW of the receiving antenna, are taken into account for altitude estimation.

After one cross-correlation coherent time period, the reflection specular point corresponding to one of the GNSS satellites has traveled a path on the sea surface whose length depends on its velocity and on the adopted coherent integration time. Typical specular point velocities for LEO orbit altitudes range between 6 and 6.5 km/s and coherent integration time usually don't exceed 20 ms.

Figure 6:
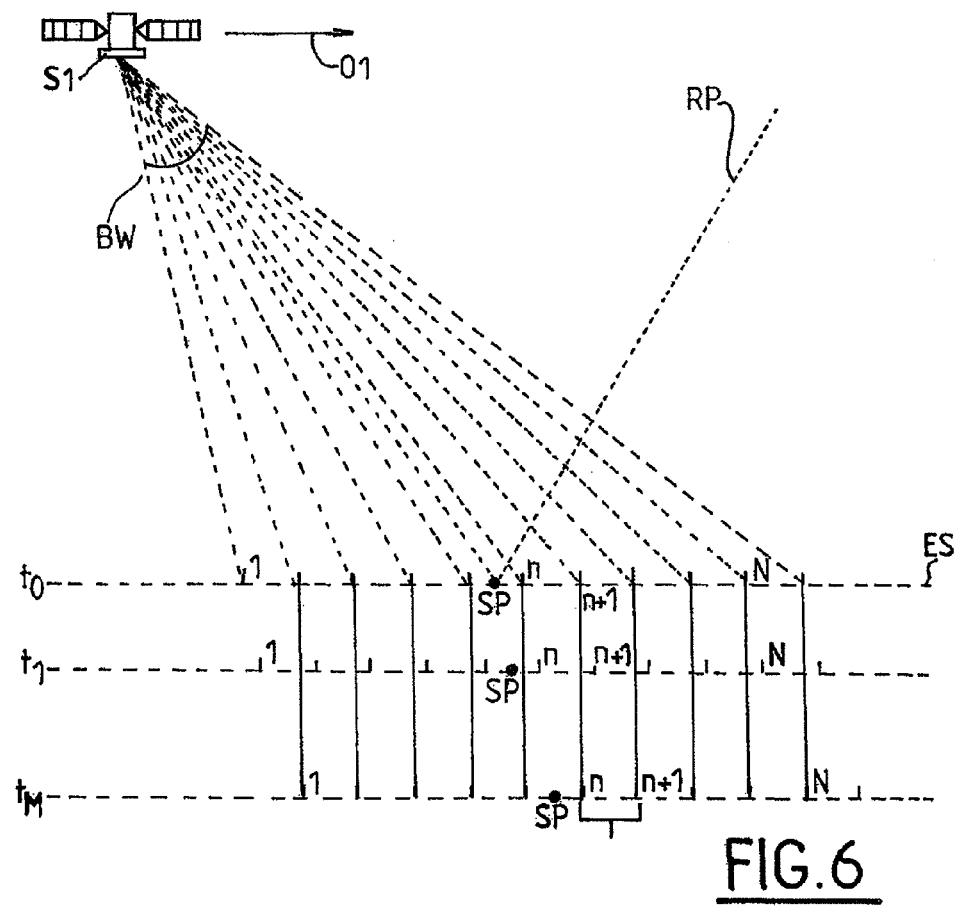

Indeed, the maximum coherent integration time is practically constrained by the correlation time of the Earth surface and by the bit-rate of the information modulating the navigation code, if present: see S. J. Frasier, A. J. Camps, "Dual-Beam Interferometry for Ocean Surface Current Vector Mapping", IEEE Transactions on Geosciences and Remote Sensing, Vol. 39, No. 2, February 2001. On the other hand, as presented before, the width of the Doppler zones is inversely proportional to the coherent integration time. Considering the above introduced integration time and typical satellite altitudes, the Doppler zones have a footprint width on the order of 500 m-1 km. Denoting by $t_0$ the origin of the time reference, after one coherent correlation period, at time $t_1$ the reflection specular point (since its trajectory is almost perpendicular to the iso-Doppler lines) has traveled only a fraction of the width of the Doppler region, as illustrated on FIG. 6. In order to produce only one waveform for each Doppler zone, an incoherent integration of M successive waveforms is performed. The number M of consecutive integrated waveforms is preferably chosen in such a way that, in a coherent integration time, the specular point SP moves by a distance equal to $1/M^{th}$ of the width of a Doppler zone. This means that the $n^{th}$ Doppler zone at time $t_M$ exactly overlaps the (n+1)th Doppler zone at time to (see FIG. 6). The time interval $t_M$-$t_0$ is called the "intra-Doppler" incoherent integration time.

After "intra-Doppler" incoherent integration, a single waveform is obtained for each Doppler bin.

In addition to "intra-Doppler" incoherent integration, the signal processing method of the invention comprises a step of incoherently summing waveforms corresponding to signals scattered by a same region of the Earth surface at different times during motion of the first platform, and therefore affected by different Doppler shifts ("inter-Doppler" integration or averaging). As the specular point moves along the ocean surface, the height of each scattering point on the Earth surface is estimated sequentially from the highest Doppler to each lower frequency bin, until the point is out of the field of view (3 dB Antenna beamwidth); for each ocean region, incoherent averaging is then applied across the waveforms obtained, at different times, in the different Doppler bins. This way, for each ocean Doppler limited footprint, N different waveforms are accumulated (note that for each Doppler footprint only one waveform is obtained after the intra-Doppler incoherent integration step, as described above). These waveforms are subsequently incoherently averaged, without degrading spatial resolution, since exact footprint overlap among Doppler waveforms is intentionally kept, as illustrated on FIG. 6.

If precision of the altitude estimation is more important than high spatial resolution, a third integration step can be included, wherein the waveforms of adjacent footprints are incoherently averaged. The number of Doppler regions averaged is essentially determined by the target spatial resolution. For example, mesoscale altimetry requires high measurement precision, but does not need a spatial resolution better than about 100 km.

An exemplary implementation of the signal processing necessary for carrying out the altimetry method of the invention will be now described with reference to FIG. 7.

The first processing step comprises the parallel calculation of N cross-correlations between a received signal RS and a plurality of frequency-shifted, locally generated replicas LGR of the positioning signal emitted by the second satellite S2. The timing and frequency of the LGR signal depend on the relative position of the S1, S2 satellites and of the Earth surface; therefore, they are computed in real time by a "geometry processor" GP. This is a significant difference with respect to the case of prior-art monostatic delay-Doppler altimeters.

Figure 7:
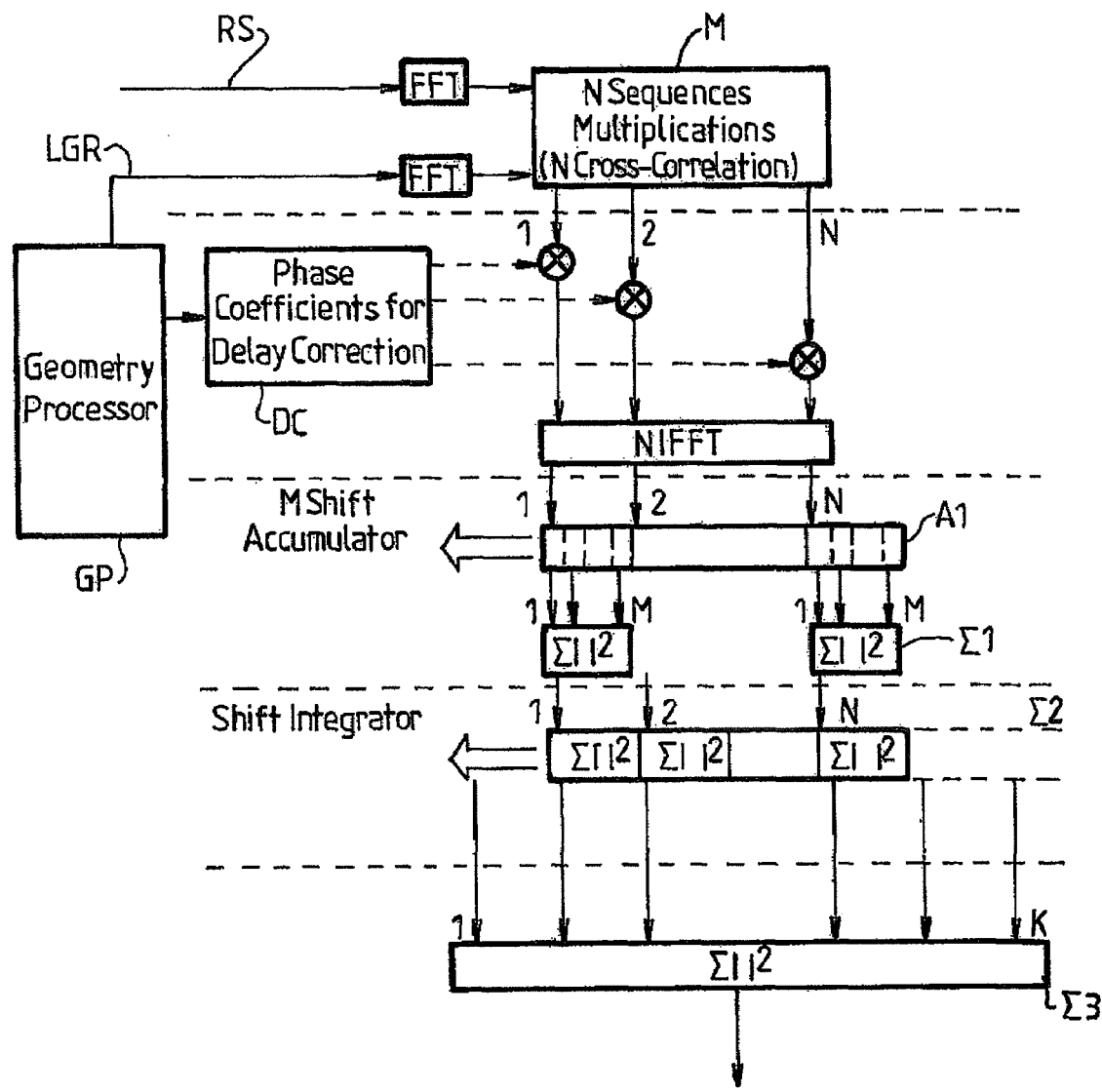
FIG. 7, a flow-chart of the signal processing algorithm carried out according to an embodiment of the invention.

As depicted on FIG. 7, the cross-correlations can be computed in the frequency domain: both the received signal and the locally generated replicas are Fourier-transformed (FFT blocs) and then multiplied in a multiplier bloc M.

Delay-Doppler curvature compensation can be easily performed in the frequency domain by multiplying each Doppler waveform by a phase coefficient provided by a Doppler compensation bloc DC. Again, the phase factors for each Doppler waveform depend on the geometrical configuration of the system, and therefore they are evaluated numerically by the "geometry processor" GP. They are continuously updated in such a way that the height measurement error due to delay correction is significantly lower than the wanted final height measurement precision.

After delay compensation an inverse Fourier transform (IFFT bloc) is applied to each Doppler bin waveform.

Alternatively, cross-correlations can be computed directly (in the time domain), but even in this case the delay-Doppler curvature compensation is most advantageously carried out in the frequency domain.

Cross-correlation and curvature compensation are performed for M successive coherent integration periods, as discussed above (see FIG. 6). The resulting M waveforms for each of the N Doppler bins are stored in consecutive cells of a shift register A1, and then incoherently summed by the N summing blocs $\Sigma 1$. This way, at the end of the "intra-Doppler" incoherent integration step, a single waveform is obtained for each Doppler zone of the Earth surface.

These waveforms are then loaded into a shift register $\Sigma 2$ and incoherently summed to the waveforms already stored in said register. After each addition, the register cells are shifted by one position. This allows integrating all the waveforms corresponding to a single region of the Earth surface, received at different time and therefore with a different Doppler shift (incoherent <<inter-Doppler>>integration).

If appropriate, additional incoherent averaging in order to improve precision while degrading spatial resolution can be obtained by integrating the power waveforms from different ocean footprints in a third integration bloc $\tau 3$. The number K of averaged footprint waveforms is chosen according to the target spatial resolution.

According to different embodiments of the invention, data processing can be entirely performed on-board, or be shared between the space and ground segments. In a typical distributed processing scheme, the parallel correlations and a rough delay curvature correction could be performed on-board; the leading edges of the waveform can be stored and transmitted on ground, guaranteeing reasonable data rates. A refinement of the delay correction, incoherent averaging and calculation of the altimetry profile of the Earth surface can subsequently be performed on ground.

The height measurement precision of an altimeter according to the invention will be now compared to that of a conventional PARIS altimeter. This comparison has been performed with the help of numerical simulations. The reference scenario is defined by the following parameters:

Navigation signal: GPS at L5, central frequency at 10.23 Mchipps.

Orbit Altitude: 500 km

Reference SP Incidence Angle with respect to the nadir direction of the altimetry satellite: 16 deg Angle between the Incidence Plane and the orbital direction of the altimetry satellite: 0°

Wind Speed at sea level: 10 m/s

RX Antenna Gain: 30 dBi

RX Noise Figure: 2 dB

RX RF Bandwidth: 20 MHz

GPS L5 transmitted frequency: 1176.45 MHz

GPS EIRP: 28 dBW

Target spatial resolution: 100 km.

The incidence angle of the SP point with respect to the nadir direction of the altimeter satellite does vary with geometry, and therefore with time. However, the variation is small, and has a negligible influence on the altitude measurement. For this reason, a constant angle (16°) has been used in simulations.

The incidence plane is defined as the plane containing the two satellites (S1 and S2) and the specular reflection point SP. In the simulation, the angle between this plane and the orbital direction of the S1 satellite, O1, has been taken equal to 0°. This means that the satellite S1 moves within the incidence plane.

Focusing on a single waveform incoherently integrated $N_{inc}$ independent times, the height measurement precision $\sigma_h$ of a bistatic passive altimeter for a specular point at elevation angle $\theta_{elev,SP}$ can be evaluated analytically as:

$$\sigma_h = \frac{c\overline{P_s}}{2\sin\theta_{elev,SP}\overline{P_s'}} \sqrt{\frac{1}{N_{inc}}\left(1 + \frac{1}{SNR}\right)^2 + \frac{1}{N_{inc}}\left(\frac{1}{SNR}\right)^2}$$

where c is the light velocity, $P_s$ and $P_s'$ are respectively the mean power and the slope of the waveform at the point corresponding to the delay relative the mean sea level and SNR is the thermal signal-to-noise ratio of the waveform at the point corresponding to mean sea level.

For more detail and a derivation of this equation see:

C. Zuffada, V. Zavorotny, "Coherence Time and Statistical properties of the GPS signal scattered off the ocean surface and their impact on the accuracy of remote sensing of sea surface topography and winds", International Geoscience and Remote Sensing Symposium, Volume 7, 9-13 Jul. 2001; and R. E. Fischer, "Standard Deviation of Scatterometer Measurements from Space, IEEE Transactions on Geoscience Electronics", Vol. 10, No. 2, April 1972.

The above-presented formula can be adopted both for the invention and for the conventional PARIS case. Considering the parameter SNR as the signal-to-noise ratio of a generic single Doppler bin waveform after a coherent integration period, the equation above (adopting $N_{inc}$ corresponding to 100 km spatial resolution) would provide the height measurement precision obtained if only that Doppler bin is adopted for the estimation. Thus the final height measurement precision is obtained by incoherent integration of the N delay corrected waveforms at different Doppler bins. Thus, considering as first approximation $\theta_{elev,SP}$ and the ratio $P_s/P_s'$ constant for all the Doppler regions, the ratio of the height measurement precision of the altimeter of the invention ($\sigma_{h,S}$ where "S" stands for "synthetic aperture") and that of a PARIS altimeter $\sigma_h$ is given by:

$$\sigma_{h,S}/\sigma_h = \frac{\frac{1}{N}\sqrt{\sum_{i=1}^{N} \sigma_{h,i}^2}}{\sigma_h}$$

$$= \frac{\frac{1}{N}\sqrt{\sum_{i=1}^{N}\left[\frac{1}{N_{inc,S}}\left(1 + \frac{1}{SNR_{i,S}}\right)^2 + \frac{1}{N_{inc,S}}\left(\frac{1}{SNR_{i,S}}\right)^2\right]}}{\sqrt{\frac{1}{N_{inc}}\left(1 + \frac{1}{SNR}\right)^2 + \frac{1}{N_{inc}}\left(\frac{1}{SNR}\right)^2}}$$

where the numerator represents the incoherent averaging of the N Doppler waveforms, $SNR_{i,S}$ represents the signal-to-noise ratio of the i-th Doppler waveform and $N_{inc,S}$ is the number of incoherent averaged waveforms for each Doppler bin. Representing by $T_{100\,km}$ the time needed for the specular point SP to travel 100 km on the Earth surface and by $T_{coh}$ the coherent integration time adopted, the number of incoherent averaged waveforms for each Doppler bin is given by $N_{inc,i,S} = T_{100\,km}/T_{coh}$.

The coherent integration time $T_{coh}$ for the conventional PARIS case has been chosen in order to maximize the height precision. As already discussed, this optimum coherent integration value is equal to the correlation time of the one-chip limited footprint. It is important to remark that the incidence angle of the specular point with respect to the satellite varies as the specular point moves along the ocean surface. Therefore the Doppler bin waveforms vary consequently. However, it can be verified that, for the mission geometry considered here, the variation of the Doppler mapping geometry over 100 km path on the ocean surface is negligible. For example, for an incidence angle having an initial value of 18°, the specular point covers 100 km in approximately 16 seconds. During this period, the incidence angle at the specular point varies of about 1.5°. Therefore, as a first approximation and only in order to evaluate the height measurement precision, the Doppler waveforms variation along the flight can be considered negligible.

The performances of an instrument according to the invention have been evaluated for two configurations, both adopting a coherent integration time of 20 ms. In the first configuration 29 Doppler bins are processed, corresponding to a region on the Earth surface having a width of approximately 25 km, compared to 10 km for the one-chip footprint. In the second configuration, only 15 Doppler bins are processed, corresponding to a region on the Earth surface having the same width as the first chip zone.

Otherwise stated, in the second configuration the region of the Earth surface scattering signals useful for altitude estimation is essentially the same as in classical PARIS altimetry.

The simulations give the following values for the parameters $N_{inc,S}$ and $N_{inc}$:

$N_{inc,S} = 805$ $N_{inc} = 10732$

The number of incoherently integrated waveforms is higher in the case of PARIS than for the invention, as the corresponding integration time is lower. However, the method of the invention comprises an additional incoherent integration step, performed across the N Doppler waveforms.

The simulation shows that, in the case of the first configuration, application of the method of the invention improves the precision of the altitude estimation by about 34%-5.3 cm instead of 8.1 cm. In the case of the second configuration, no significant improvement is obtained.

This result was expected, and confirms that the performance improvement obtained thanks to the invention is due to the greater width of the processed region, and therefore to the more efficient utilization of the available signal power.

Processing a still higher number of waveforms would allow a further improvement of the precision of the altitude estimation. Therefore, a third configuration has been tested, cross-correlating N=55 waveforms in order to span completely the 3 dB antenna footprint. The resulting measurement precision is equal to 4 cm, equivalent to an improvement factor of 51% with respect to conventional PARIS.

It is worth to notice that almost doubling the number of processed Doppler bins (55 instead of 29) improves the precision by only 28% with respect to the second configuration. This is simply due to the fact that the scattered power and the RX antenna gain diminish for regions further from the specular point SP. As a consequence, the number N of Doppler processed waveforms cannot be increased indefinitely: given the antenna gain, the coherent integration time and the reference geometry, an optimum number of Doppler bins can be determined, maximizing the precision of the estimation. It is worth noting that this optimal value does not necessarily guarantees a complete coverage of the 3 dB antenna footprint.

As discussed above, the method of the invention can be used to improve the precision of PARIS altimetry by keeping the spatial resolution unchanged.

Alternatively, said method could be used to improve the spatial resolution by keeping the precision unchanged, or to improve both parameters by finding a "custom" tradeoff between them.

The invention claimed is:

1. An altimetry method for determining an elevation profile of a portion of the Earth surface (ES), comprising the steps of:
   (a) providing a signal receiver (RX) on a first platform (S1) flying above said portion of the Earth surface, for receiving a temporal series of signals emitted by a second flying platform (S2) and scattered by said portion of the Earth surface; and
   (b) computing altimetry waveforms, indicative of the elevation profile of said portion of the Earth surface, by processing the received signals;
   characterized in that said step of computing altimetry waveforms comprises:
      (b.1.1) determining correlation waveforms (XC) by cross-correlating the received signals with a plurality of locally-generated frequency-shifted replicas of the emitted signals, the frequency shift of each replica corresponding to the average Doppler shift of the signals reflected at a given time by a particular region of the Earth surface;
      (b.1.2) introducing a Doppler frequency-dependent temporal shift to the correlation waveforms in order to compensate for range delay curvature; and
      (b2) incoherently summing the temporally shifted correlation waveforms (CXC) corresponding to signals scattered by a same region of the Earth surface at different times during motion of said first platform.

2. An altimetry method according to claim 1, wherein said first and second platforms are satellites.

3. An altimetry method according to claim 1, wherein said signals emitted by the second platform are coherent signals.

4. An altimetry method according to claim 1, wherein said signals emitted by the second platform are spread-spectrum signals.

5. An altimetry method according to claim 4, wherein said signal emitted by the second platform are GNSS signals.

6. An altimetry method according to claim 5, wherein the correlation time between the received signals and the locally-generated replicas of the emitted GNSS signals is significantly longer than one chip of the latter.

7. An altimetry method according to claim 1, wherein the frequency shift between the locally-generated frequency-shifted replicas of the emitted signals is inversely proportional to the duration of said replicas.

8. An altimetry method according to claim 1, wherein said receiver on said first platform also receives signals emitted by said second flying platform through a direct path (DP), in order to generate the frequency-shifted replica to be correlated with the scattered signal.

9. An altimetry method according to claim 1, further comprising a step of incoherently summing a plurality of temporally shifted correlation waveforms corresponding to a same Doppler frequency shift and acquired within an incoherent integration time, during which the point (SP) on the Earth surface specularly reflecting the signals emitted by said second flying platform moves of a distance at most equal to the width of the corresponding Doppler zone.

10. An altimetry method according to claim 1, further comprising an additional step of spatially averaging the altimetry waveforms, in order to improve the precision of the determined elevation profile, while decreasing its spatial resolution.

11. An altimetry method according to claim 1, wherein said step of computing altimetry waveforms comprises:
   converting the received signals into the frequency domain;
   in the frequency domains, multiplying said signals by said frequency-shifted replicas thereof and introducing a Doppler frequency-dependent phase shift, corresponding to said Doppler frequency-dependent time shift in the time domain; and
   back-transforming the processed signals into the time domain.

12. An altimetry method according to claim 1, wherein the possible values of the Doppler shift introduced by the motion of the satellite and the corresponding time shifts are computed by taking into account the time-variant relative positions of the first and second platforms and of the Earth.

13. An altimetry method according to claim 1, wherein signals emitted from a plurality of second platforms are received by said receiver and processed simultaneously in order to compute said altimetry waveforms.

14. An altimetry method according to claim 1, further comprising an additional step of determining a height profile of the region of Earth surface above the first satellite on the basis of said altimetry waveforms.

15. An altimetry system comprising:
   a satellite carrying a receiver for receiving a temporal series of signals emitted by a second satellite and scattered by a portion of the Earth below said satellite; and
   signal processing means for computing altimetry waveforms, indicative of the elevation profile of said portion of the Earth surface, by processing the received signals;
   wherein said signal processing means comprise:
      a processor for generating frequency-shifted replicas of the signals emitted by said second satellite, the frequency shift of each replica corresponding to the average Doppler shift of the signals reflected at a given time by a particular region of the Earth surface;

a cross-correlator for computing correlation waveforms by cross-correlating the received signals with a said generated frequency-shifted replicas of the emitted signals;

means for introducing a Doppler frequency-dependent temporal shift to the correlation waveforms in order to compensate for range delay curvature; and means for incoherently summing the temporally shifted correlation waveforms corresponding to signals scattered by a same region of the Earth surface at different times during motion of said first platform.

* * * * *